United States Patent [19]
Greatbatch et al.

[11] 3,981,744
[45] Sept. 21, 1976

[54] ENCLOSURE FOR LITHIUM-IODINE CELL AND METHOD OF MAKING THE SAME

[75] Inventors: Wilson Greatbatch, Clarence; Ralph T. Mead, Kenmore, both of N.Y.

[73] Assignee: Wilson Greatbatch, Ltd., Clarence, N.Y.

[22] Filed: Oct. 8, 1974

[21] Appl. No.: 513,127

Related U.S. Application Data

[63] Continuation of Ser. No. 328,312, Jan. 31, 1973, abandoned.

[52] U.S. Cl. ................. 429/178; 429/181; 429/176; 29/623.2; 29/623.4
[51] Int. Cl.² .......................................... H01M 4/36
[58] Field of Search ............... 136/83 R, 6 R, 100, 136/166, 167–170

[56] References Cited
UNITED STATES PATENTS

| | | |
|---|---|---|
| 3,003,012 | 10/1961 | Duddy ............................ 136/10 X |
| 3,196,049 | 7/1965 | Schilke ........................ 136/83 R X |
| 3,314,823 | 4/1967 | Balaguer ............................ 136/166 |
| 3,424,621 | 1/1969 | Rogers ......................... 136/83 R X |
| 3,484,296 | 12/1969 | Buzzelli ........................... 136/100 R |
| 3,553,020 | 1/1971 | Corbin ............................ 136/6 GV |
| 3,723,183 | 3/1973 | Greatbach ........................ 136/83 R |

*Primary Examiner*—John H. Mack
*Assistant Examiner*—C. F. Lefevour
*Attorney, Agent, or Firm*—Christel & Bean

[57] ABSTRACT

An enclosure for a lithium-iodine cell including a first casing containing the cell components and a second casing containing the first casing. The first casing is disposed so that the lid thereof is adjacent the bottom of the second casing. Both casings are of a material which is non-reactive with iodine such as epoxy material. The first casing is encapsulated in a polyester material for electrical insulation and sealing against iodine migration. The second casing is placed in an hermetically sealed outer casing of metal, the second casing being spaced from the lid of the outer casing.

15 Claims, 6 Drawing Figures

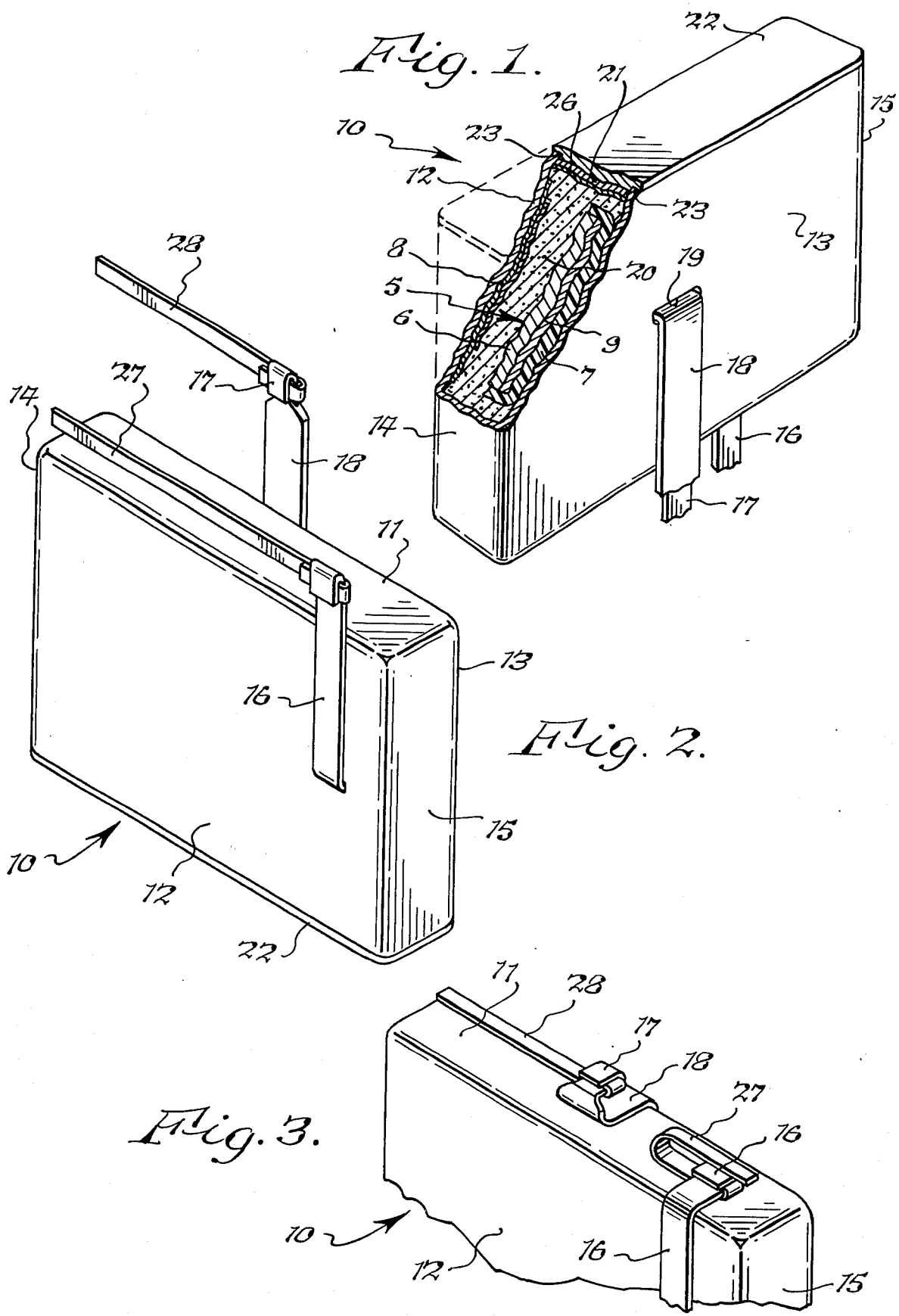

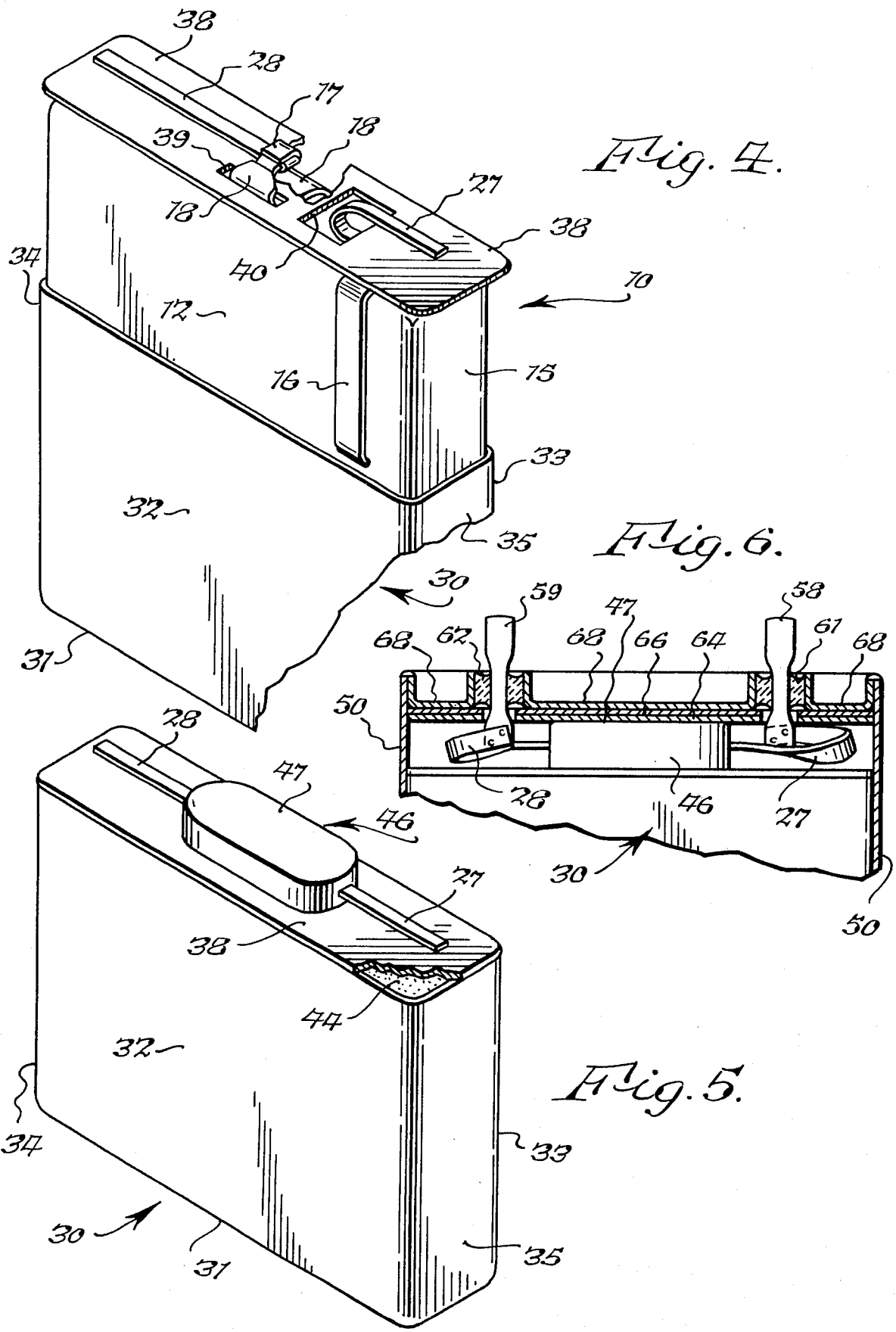

3,981,744

ENCLOSURE FOR LITHIUM-IODINE CELL AND METHOD OF MAKING THE SAME

This is a continuation of application Ser. No. 328,312 filed Jan. 31, 1973 now abandoned.

BACKGROUND OF THE INVENTION

This invention relates to the conversion of chemical energy to electrical energy, and more particularly to a new and improved enclosure for lithium-iodine cells and a method of making of the same.

One area of use of the present invention is in providing electrical power to inaccessible devices in the human environment, for example to an implanted cardiac pacemaker, although the principles of the present invention can be variously applied. Various batteries for implantable cardiac pacemakers have been proposed, but heretofore all have certain limitations. Recently, a lithium-iodine cell has been proposed which advantageously has an open circuit voltage about twice that of the mercury cell, does not generate gas during operation, and has a non-corrosive electrolyte. A problem arises, however, from the viscous nature of the iodine-containing material such as an iodine complex in that it tends to flow and might form a short circuit path between the anode and cathode. It is important to prevent such leakage, not only to maintain cell operation but also to prevent harm to a human body in which the cell may be implanted.

SUMMARY OF THE INVENTION

It is, therefore, an object of this invention to provide a new and improved enclosure for a lithium-iodine cell.

It is a further object of this invention to provide such an enclosure which seals against any leakage of iodine-containing material from the cell as well as sealing against any gas released thereby.

It is a further object of this invention to provide such an enclosure which minimizes the chance of damage from any leakage of iodine-containing material which might occur.

It is a further object of this invention to provide such an enclosure which is relatively easy and economical to form and has a long wear life.

The present invention provides an enclosure for a lithium-iodine cell including a first casing containing the cell components and a second casing containing the first casing, the two casings being in inverted relationship. The first casing is encapsulated in polyester material for electrical insulation and sealing against iodine migration. The two casings are of a material which is non-reactive with iodine such as epoxy material. The second casing is placed in an hermetically sealed outer casing of metal.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a perspective view of a portion of an enclosure for a lithium-iodine cell according to the present invention and having parts broken away to show a cross-section of the cell components;

FIG. 2 is a perspective view of the cell of FIG. 1 inverted to show a stage in the assembly of external electrical leads;

FIG. 3 is a fragmentary perspective view similar to FIG. 2 showing a subsequent stage in the lead assembly;

FIG. 4 is a perspective view of another portion of the cell enclosure of the present invention;

FIG. 5 is a perspective view of the enclosure portion of FIG. 4 in finished form; and FIG. 6 is a fragmentary sectional view of a completed cell enclosure according to the present invention.

DETAILED DESCRIPTION OF THE ILLUSTRATED EMBODIMENT

An enclosure for a lithium iodine cell according to the present invention comprises a first hollow casing 10 which preferably is rectangular in shape and of a suitable plastic material which is non-reactive with iodine, preferably epoxy material. Alternatively fluoropolymer or polyester material can be used, and in the case of polyester material it is preferably to provide fiberglass reinforcement. Casing 10 is molded or otherwise formed to be of integral construction including a bottom 11, spaced-apart side walls 12, 13 extending from bottom 11 and spaced apart end walls 14, 15 also extending from bottom 11 and joining corresponding ones of the side walls 12, 13. Casing 10 has an open top but this is sealed closed after the cell has been assembled as will be described in detail presently.

The cell components including anode and cathode are positioned within casing 10. This can be performed in various ways giving various suitable arrangements of the components. For example, an anode assembly 5 including a lithium member 6 positioned in a holder 7 could be secured to the inner surface of the one side wall 13, and a cathode current collector element 8 could be secured to the inner surface of the opposite side wall 12. An electrical conductor 16 is connected to cathode current collector 8 and extends through an aperture provided in wall 12 of casing 10 for providing an externally available electrical connection to the cathode current collector. Similarly, an electrical conductor 17 provided with insulation 18 is connected to the anode, in particular to an anode current collector 9 in the anode assembly, which conductor extends through an aperture 19 in casing wall 13 for providing an externally available electrical connection to the anode of the cell. The cell is completed by cathode means 20 comprising iodine-containing material within casing 10. The material fills or occupies the interior of casing 10 in an amount sufficient to contact an exposed surface portion of lithium member 6 of the anode as well as the cathode current collector 8. One preferred form of iodine-containing material is a charge transfer complex of an organic material, such as 2-vinyl pyridine polymer, and iodine. The material is a viscous, flowable substance which is poured into casing 10. As soon as the iodine-containing material 20 is placed in casing 10 in contact with the surface of the lithium anode member 6, a lithium iodide electrolyte begins to form and an electrical potential difference exists between the anode and cathode electrical leads 16, 17.

The iodine-containing material 20 fills the interior of casing 10 to a level adjacent the opening in casing 10, and casing 10 is sealed closed by closure means comprising a layer of epoxy material 21 overlaying the contents of casing 10 including the iodine-containing material 20 and disposed adjacent the opening and a lid member 22 fitted in the opening and contacting epoxy material 21 whereby the epoxy material seals lid member 22 to casing 10. Epoxy material 21 also prevents trapping of air bubbles within casing 10. Lid member 22 preferably is of epoxy material and is provided with a peripheral recess 23 defining a shoulder to facilitate fitting of lid member 22 on the edge of the opening in casing 10. The arrangement preferably includes a strip 26 of fiberglass cloth material positioned between the iodine containing material or depolarizer 20 and layer 21 of epoxy material. Fiberglass strip 26 serves to prevent any loss of the depolarizer as lid member 22 is pressed down onto casing 10 during assembly. Without strip 26, there would be a liquid-liquid interface between the depolarizer 20 and epoxy material 21 which might allow some leakage of depolarizer as lid member 22 is pressed into place.

The cathode and anode electrical leads 16 and 17, respectively, preferably are of zirconium metal and are disposed along corresponding sidewalls 12, 13 of casing 10 and extend beyond the bottom 11 thereof. Zirconium leads 16, 17 are welded to nickel leads 27, 28 which extend at right angles to the corresponding leads 16, 17 as viewed in FIG. 2 for a purpose to be described. Each nickel lead 27, 28 is provided with a return bend or fold at one end, and each zirconium lead 17, 18 is spot welded to the corresponding nickel lead 27, 28 between the folds in the nickel lead. In the present illustration, nickel lead 27 is welded to zirconium lead 16 at a point thereon spaced from housing bottom 11 a distance approximately twice the spacing of nickel lead 28 on zirconium lead 17 from bottom 11. Then each zirconium lead 16, 17 is cut in a manner leaving a short tab or extension which is folded back over the corresponding nickel lead 27, 28 as shown in FIG. 2. The zirconium and nickel leads are again welded in two places.

The enclosure of the present invention further comprises a second hollow casing 30 enclosing the first casing 10. Casing 30 preferably is hollow rectangular in shape, being of a size sufficient to contain casing 10, and is of a suitable plastic material which is non-reactive with iodine such as epoxy material. Casing 30 is molded or otherwise formed to be of an integral construction including a bottom 31, spaced-apart end walls 34, 35 also extending from bottom 31 and joining corresponding ones of the side walls 32, 33. After casing 10 has been provided with the cell components and sealed closed in the manner previously described, casing 10 is placed in casing 30 with lid member 22 of casing 10 adjacent bottom 31 of casing 30 and leads 16, 17 and 27, 28 adjacent the open top of casing 30.

A lid member 38 provided with openings 39 and 40 for the lead members is placed on to the open top of casing 30 to close the same. Lid member 38 is of the same material as casing 30 and is provided with a peripheral recess defining a shoulder to facilitate fitting of lid member 38 on the edge of the opening in casing 30 the same as recess 23 of lid 22. The lead members 17, 27 and 18, 28 are inserted through the openings 39 and 40, respectively, and then given a final folding operation so as to be disposed as shown in FIG. 4 when lid member 38 is in position on casing 30. In this connection, FIG. 3 shows the leads as they would appear folded after insertion through cover 38 (not shown in FIG. 3). The actual final folding is performed after the leads are inserted through the cover 38. Specifically, lead members 16, 27 and 17, 28 would be first partially folded to facilitate their being fitted through openings 39, 40 whereupon they are finally folded into the position of FIG. 4 wherein leads 27 and 28 extend in opposite directions along and spaced parallel to lid member 38 and generally parallel to sidewalls 32, 33 of casing 30.

After lid member 38 has been positioned in place, potting material 44 is added to the interior of casing 30, such as through the relatively larger lid opening 40, in a manner encapsulating casing 10. During the potting operation a vacuum degassing operation is performed on the interior of casing 30. Potting material 44 is of the type which is non-reactive with iodine, preferably polyester material. Polyester potting material 44 provides electrical insulation, holds inner casing 10 within the outer casing 30, and seals against any leakage of depolarizer or gas from casing 10. While other potting materials could be employed, room temperature cured polyester material has been found to be the least reactive with iodine and therefore the most effective in providing long term sealing or isolation against iodine migration.

FIG. 5 illustrates a cell assembly upon completion of the potting operation. A raised portion or protuberance 46 is formed of potting material 44 on lid member 38 covering openings 39 and 40. Portion 46 is of sufficient thickness so that leads 27 and 28 extend out from the sides thereof, and the portion 46 has a planar top surface 47 which is substantially co-planar with lid member 38.

The cell enclosure of the present invention is completed by a third hollow casing 50 shown in FIG. 6 which encloses the second casing 30. Casing 50 preferably is hollow rectangular in shape, being of a size sufficient to contain casing 30, and is of metal such as stainless steel. Casing 50 is cast or otherwise formed to be of integral construction including a bottom; spaced-apart side walls extending from the bottom, and spaced-apart end walls also extending from the bottom and joining corresponding ones of the side walls. Thus casing 50 has a shape similar to that of casing 30 and casing 10.

Casing 30 is placed in casing 50 with leads 27, 28 adjacent the open top of casing 50. Leads 27, 28 are bent around and welded to the ends of corresponding terminal members 58, 59 in the manner illustrated in FIG. 6, each of which terminals is fitted in or embraced by a bushing 61, 62 of electrically insulating material. Terminals 58, 59 preferably are of stainless steel. An electrical insulating member or strip 64 of Teflon material is supported on the planar surfaces 47 of portion 46, a thermal insulating member or strip 66 of fiberglass material is supported on member 64, and terminals 58, 59 extend through apertures provided in members 64 and 66. The enclosure is sealed by a lid header member 68 which fits in the opening of casing 50 and is welded therein to form an hermetically sealed enclosure. The hermetic seal confines any gas generated by the cell within the enclosure and it keeps any external moisture from entering the cell. Bushings 61, 62 are sealed in openings formed in header 68 and the other ends of terminals 58, 59 project beyond header 68 for making electrical connections to the cell. By virtue of this arrangement, header member 68 and insulator strips 64, 66 are supported on surface 47 of portion 46 so as to be spaced from casing 30. The region or space therebetween not only provides room for leads 27, 28 and connection thereof to terminals 58, 59 but also provides a space to accommodate any leakage of depolarizer, should that occur, thereby preventing any leaking depolarizer from contacting header 68. The strip of fiberglass material 66 provides thermal insulation for the electrical insulator strip 64 from heat developed by and around the header 68. In the enclosure of the present invention, leakage of the iodine-containing cathode material is prevented by the nature of the material of casing 10 and the sealing of lid 22 thereto. Casing 10 is of a material which is non-reactive with iodine, such as epoxy, and lid 22 is sealed with a material which is both an effective sealant and non-reactive with iodine such as liquid epoxy. Should any leakage of the viscous iodine-containing material from casing 10 occur, however, the enclosure of the present invention provides the longest possible leakage path thereby minimizing the probability of any damaging effects from such leakage. This is provided by the arrangement of inverted casings 10 and 30. Thus any material leaking from casing 10 near lid 22 thereof will have to flow practically the entire length of casing 30 in order to reach lid 38. However, the chance of this happening is greatly reduced by the encapsulation of casing 10 in polyester potting material 44. The polyester material provides electrical insulation and long term sealing against iodine leakage. The casing 30 confines any gas which may leak from casing 10, and this is augmented by the hermetic seal between casing 50 and lid 68. As a result, the enclosure of the present invention affords a long lifetime for the lithium-iodine cell and renders it safely implantable and usable in the human body.

It is therefore apparent that the present invention accomplishes its intended objects. While a single embodiment of the present invention has been described in detail, this is for the purpose of illustration, not limitation.

We claim:
1. A lithium-iodine cell enclosure comprising:
 a. a first hollow casing of a material which is non-reactive with iodine and having an opening at one end, said casing containing a lithium-iodine cell comprising a lithium anode, iodine-containing cathode material and a lithium iodide electrolyte;
 b. closure means of a material which is non-reactive with iodine for sealing the opening in said first casing;
 c. a second hollow casing enclosing said first casing, said second casing having an opening at one end which is closed by a closure means sealed thereto, said second casing being inverted relative to said first casing whereby said closure means of said first casing is adjacent an end of said second casing opposite said closure means of said second casing so that any iodine-containing material which may happen to leak past said closure means of said first casing must flow along the entire dimension of said first casing before reaching said closure means of said second casing thereby minimizing the probability of any damaging effects from such leakage;
 d. said first and second casings being generally of the same shape and in relatively close-fitting relation;
 e. a third hollow casing enclosing said first and second casings, said third casing having an opening at one end and which is closed by a lid member hermetically sealed to said third casing; and
 f. spacing means between said second casing and said lid member of said third casing for providing a space to receive any substances released from said first or second casings.

2. Apparatus according to claim 1, wherein said first casing and said closure means are of epoxy material.

3. Apparatus according to claim 1, wherein said first casing and said closure means are of polyester material reinforced with fiberglass.

4. Apparatus according to claim 1, wherein the anode, cathode and electrolyte of said cell occupy the interior of said first casing to a level adjacent said opening and wherein said closure means of said first casing comprises:
 a. a layer of epoxy material overlaying the contents of said casing and disposed adjacent said opening; and
 b. a lid member fitted to said opening and contacting said epoxy material whereby said epoxy material seals said lid member to said casing.

5. Apparatus according to claim 1, further including polyester material in said second casing and encapsulating said first casing.

6. Apparatus according to claim 1, wherein said third casing is of metal.

7. Apparatus according to claim 1, wherein said lid member is provided with electrical terminal means and wherein said apparatus further comprises a member of thermal insulating material between said lid member and said second casing and a member of electrical insulating material between said member of thermal insulating material and said second casing.

8. Apparatus according to claim 4, wherein said lid member is of epoxy material.

9. Apparatus according to claim 4, further including a strip of fiberglass cloth material positioned between the contents of said first casing and said layer of epoxy material.

10. Apparatus according to claim 5, wherein said second casing is of epoxy material.

11. Apparatus according to claim 5, wherein said second casing is of polyester material reinforced with fiberglass.

12. A method of enclosing a lithium-iodine cell comprising the steps of:
 a. providing a first hollow casing of a material which is non-reactive with iodine and having an opening at one end;
 b. placing a lithium anode and a cathode current collector in said first casing in spaced relation to each other;
 c. introducing iodine-containing material into said first casing and in operative contact with said lithium anode and said cathode current collector;
 d. sealing the opening in said first casing;
 e. placing said first casing in a second hollow casing having an opening at one end in a manner such that said second casing is inverted relative to said first casing with the sealed end of said first casing adjacent an end of said second casing opposite the opening in said second casing;
 f. introducing potting material into said second casing in a manner encapsulating said first casing, said potting material being non-reactive with iodine;
 g. sealing the opening in said second casing;
 g. whereby any iodine-containing material which may happen to leak through the sealed end of said first casing must flow along the entire dimension of said first casing before reaching the sealed end of said second casing thereby minimizing the probability of any damaging effects from such leakage;

i. placing said first and second casings in a third hollow casing having an opening at one end; and j. hermetically sealing a lid member to the opening in said third casing.

13. A method according to claim 12 wherein said first casing is of epoxy material and said iodine-containing material fills said casing to a level adjacent the opening and wherein the opening in said first casing is sealed by the steps of:

a. adding a liquid epoxy material onto the contents of said casing adjacent the opening therein; and b. fitting a lid member of epoxy material into the opening and in contact with said epoxy material whereby said epoxy material bonds the lid member to the casing.

14. A method according to claim 12, wherein said potting material comprises polyester material.

15. A method according to claim 13, further including a step of placing a strip of fiberglass cloth material on the iodine-containing material prior to applying the epoxy material.

* * * * *